US011528678B2

(12) United States Patent
Gupta et al.

(10) Patent No.: US 11,528,678 B2
(45) Date of Patent: Dec. 13, 2022

(54) CROWDSOURCING AND ORGANIZING MULTIPLE DEVICES TO PERFORM AN ACTIVITY (71) Applicant: EMC IP Holding Company LLC, Hopkinton, MA (US)

(72) Inventors: Shubham Gupta, Jaipur (IN); Sathish Kumar Bikumala, Round Rock, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/722,128

(22) Filed: Dec. 20, 2019

(65) Prior Publication Data
US 2021/0195549 A1  Jun. 24, 2021

(51) Int. Cl.
H04W 60/04 (2009.01)
H04W 84/18 (2009.01)
H04W 4/20 (2018.01)
H04W 4/08 (2009.01)
H04W 4/021 (2018.01)

(52) U.S. Cl.
CPC ........... *H04W 60/04* (2013.01); *H04W 4/021* (2013.01); *H04W 4/08* (2013.01); *H04W 4/203* (2013.01); *H04W 84/18* (2013.01)

(58) Field of Classification Search
CPC ....... H04W 60/04; H04W 4/021; H04W 4/08; H04W 4/203; H04W 84/18
See application file for complete search history.

(56) References Cited

U.S. PATENT DOCUMENTS 8,577,355 B1 * 11/2013 Shaw .................. H04L 67/2823
                                            455/418
9,158,333 B1   10/2015 Froment et al.
9,277,321 B2 *  3/2016 Toivanen ................. H04R 5/04
9,689,958 B1 *  6/2017 Wild ........................ G01S 3/802
9,692,841 B1 *  6/2017 Chandler ................ H04L 67/10
(Continued)

FOREIGN PATENT DOCUMENTS

WO    WO-2008067675 A1 *  6/2008  ............. H04L 67/04

OTHER PUBLICATIONS

Kim et al. ; "Utilizing Smartphones as a Multi-Device Single Display Groupware to Design Collaborative Games"; Collaboration; DIS 2017, Jun. 10-14, 2017, Edinburgh, UK (Year: 2017).*

*Primary Examiner* — Jerry B Dennison
(74) *Attorney, Agent, or Firm* — Krishnendu Gupta; Deepika Bhayana; Lesley A. Leonessa (57) ABSTRACT

As an example, a computing device may broadcast, via a software application, a message to multiple computing devices requesting devices to participate in an activity occurring at a particular time at a particular location. A subset of the multiple computing devices may gather at the particular location prior to the particular time to participate in the activity. Prior to the particular time, the computing device may discover the subset and create a peer-to-peer network. Based on a set of attributes associated with each computing device in the subset, the computing device may assign individual computing devices in the subset a role and a position. Each of the computing devices in the subset may be positioned in the particular location according to the position and perform the role at the particular time to collectively perform the activity.

19 Claims, 6 Drawing Sheets

(56) References Cited

U.S. PATENT DOCUMENTS

| | | | | |
|---|---|---|---|---|
| 9,763,280 B1* | 9/2017 | Allen | ............... | H04W 8/005 |
| 10,218,777 B2* | 2/2019 | Pistoia | ............... | H04W 4/60 |
| 10,223,060 B2* | 3/2019 | Karacas | ............... | G06F 3/1431 |
| 10,348,841 B1* | 7/2019 | Nierenberg | ............... | H04W 4/025 |
| 10,455,354 B2* | 10/2019 | Hu | ............... | H04W 4/02 |
| 10,741,044 B1* | 8/2020 | Heintzelman | ............... | H04W 4/021 |
| 11,093,197 B2* | 8/2021 | Vigna | ............... | G06F 3/1446 |
| 2008/0216125 A1* | 9/2008 | Li | ............... | H04N 13/239 725/62 |
| 2012/0280898 A1* | 11/2012 | Lucero | ............... | G06F 3/1446 345/156 |
| 2013/0132469 A1* | 5/2013 | Levicki | ............... | H04L 65/4084 709/203 |
| 2013/0238370 A1* | 9/2013 | Wiseman | ............... | G06Q 50/01 705/5 |
| 2014/0132833 A1* | 5/2014 | Wang | ............... | H04N 21/4122 348/383 |
| 2014/0143004 A1* | 5/2014 | Abhyanker | ............... | G06Q 30/02 705/7.19 |
| 2014/0169569 A1* | 6/2014 | Toivanen | ............... | H04R 5/04 381/17 |
| 2014/0285312 A1* | 9/2014 | Laaksonen | ............... | H04R 3/12 340/4.42 |
| 2014/0313103 A1* | 10/2014 | Goel | ............... | G09G 5/14 345/2.2 |
| 2014/0355517 A1* | 12/2014 | Reunamaki | ............... | H04W 8/005 370/328 |
| 2015/0012342 A1* | 1/2015 | Rostamian | ............... | G06Q 30/0252 705/14.5 |
| 2015/0058324 A1* | 2/2015 | Kauwe | ............... | G06F 16/284 707/722 |
| 2015/0095767 A1* | 4/2015 | Ebner | ............... | G06F 16/9577 715/238 |
| 2015/0120406 A1* | 4/2015 | Ekberg | ............... | G06Q 30/0641 705/14.5 |
| 2015/0254045 A1* | 9/2015 | Drake | ............... | G06Q 30/0625 345/1.3 |
| 2015/0346857 A1* | 12/2015 | Zhang | ............... | G06F 3/00 345/175 |
| 2016/0210602 A1* | 7/2016 | Siddique | ............... | G06Q 10/0637 |
| 2017/0251231 A1* | 8/2017 | Fullerton | ............... | H04N 21/8547 |
| 2018/0054465 A1* | 2/2018 | Karacas | ............... | G06F 3/1431 |
| 2019/0124159 A1* | 4/2019 | Alsina | ............... | H04N 21/4302 |
| 2019/0205562 A1* | 7/2019 | Alameh | ............... | H04W 4/021 |
| 2020/0293995 A1* | 9/2020 | El Shawwa | ............... | G06F 9/5005 |
| 2021/0195549 A1* | 6/2021 | Gupta | ............... | H04W 4/203 |

* cited by examiner

CROWDSOURCING AND ORGANIZING MULTIPLE DEVICES TO PERFORM AN ACTIVITY

BACKGROUND OF THE INVENTION

Field of the Invention

This invention relates generally to using multiple devices to perform an activity (e.g., watching a movie, listening to music, performing a video conference, or the like) and more particularly to crowdsourcing the multiple devices to perform and distributing portions of the activity to each device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When away from the home, such as when on vacation, a family or a group of friends may together have multiple devices, including, for example, smartphones, tablets, laptops, 2-in-1s (e.g., a tablet that can be converted into a laptop with the addition of a keyboard) and the like. Unfortunately, there is no convenient way in which the friends or family can use the multiple devices collectively to perform an activity, such as watching a movie, listening to music, performing a video conference, or the like.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

As an example, a computing device may broadcast, via a software application, a message to multiple computing devices requesting devices to participate in an activity occurring at a particular time at a particular location. A subset of the multiple computing devices may gather at the particular location prior to the particular time to participate in the activity. Prior to the particular time, the computing device may discover the subset and create a peer-to-peer network. Based on a set of attributes associated with each computing device in the subset, the computing device may assign individual computing devices in the subset a role and a position. Each of the computing devices in the subset may be positioned in the particular location according to the position and perform the role at the particular time to collectively perform the activity.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein use a software application ("app") that is installed on multiple devices to gather a subset of the multiple devices together and assign each device a particular role based on each device's attributes to enable the subset of devices to collectively perform an activity, such as watching a movie or show, listening to music, performing a video conference, or the like. For example, when a group, such as a family or friends, are away from home (e.g., on vacation), each member of the group may have one or more devices (e.g., smartphone, tablet, 2-in-1, laptop, or the like). The app enables one member of the group to send a message inviting other members of the group to bring one or more devices to participate in an activity. For example, the activity may include watching a movie or show by streaming video content, engaging in a video conference, listening (or dancing) to music by streaming music content, and other activities that can be performed using multiple devices. Each member of the group may receive, on at least one of their devices, the message with the request to participate in the activity. The message may indicate the activity, the activity location (e.g., a location where the activity is to take place), and a time when the activity is scheduled to begin (or a time range indicating a proposed start time and a proposed stop time). The device may determine and display a distance between the activity location and a current location of the device. If the user of the device decides to participate in the activity, the user may transport the device (and/or other devices owned or associated with the user) to the activity location.

The device that sent the message may initiate a discovery process at the activity location at (i) a predetermined time prior to the scheduled start of the activity or (ii) in response to a user initiating the discovery process. During the discovery process, the device may discover (e.g., using Bluetooth, Wi-Fi Direct, or a similar wireless technology) other devices that are available to participate in the activity. After discovering the available devices, the device may create a local area network (LAN) with the available devices, such as an ad-hoc network, a peer-to-peer network, Bluetooth pairing, or another type of local wireless network. The LAN may use a communications protocol such as Bluetooth, Wi-Fi Direct, ZigBee, or the like. The device may send a request to each of the available devices to send a set of attributes associated with the available device. For example, the set of attributes may include video attributes (e.g., screen size, screen resolution, and the like), audio attributes (e.g., number of transducers, size of each transducer, frequency response of each transducer, maximum output volume, and the like), and computer attributes, such as, type of processor, number of cores, processor speed, amount of storage (e.g., memory and disc), networking capabilities, connection technology (e.g., Ethernet, type of Wi-Fi, type of cellular connection (3G, 4G, 5G)), maximum upload and download speeds, and other computer-related attributes.

After receiving the set of attributes of each of the available devices, the device may analyze each set of attributes and determine what type of role each of the available devices is to have when the available devices collectively perform the activity. For example, a particular device having the highest computer attributes (e.g., fastest download speed, highest number of processor cores, fastest clock speed, or the like) may be designated as a master device.

The master device may periodically (e.g., at a predetermined time interval, such as every 30 seconds, every minute, every 5 minutes, or the like) discover the available devices, request the set of attributes of any newly discovered device(s), and determine a role for individual devices. In this way, the available devices may dynamically change and the master device may modify the role of individual devices based on the attributes of the currently available devices. The device that initially requested the set of attributes from individual devices may initially be designated, by default (because initially, it is the only available device), as the master device. After analyzing the set of attributes of the available devices, including the device's own attributes, the device may, in some cases, hand over the role of master device to one of the other available devices. For example, a user may broadcast a message to engage in the activity of viewing (e.g., streaming) a show or movie via a smartphone. After additional devices come into the vicinity of the location where the activity is to take place, one of the additional devices, such as a laptop or a tablet that has increased processing capabilities compared to the smartphone, may be designated the role of master device. The master device may assign, based on the analysis of the set of attributes of individual devices, a second device of the available devices to have the role of audio master and a third device of the available devices to have the role of video master. In some cases, the master device may assign the role of streaming master to a third device of the available devices while in other cases, the master device may also assume the role of the streaming master. The role of streaming master may be assigned to the device with the fastest download speed and may be used to stream content (e.g., music or video) from a streaming service (e.g., Netflix®, Disney®+, Amazon® Prime®, Apple® TV, iTunes®, or the like). For video, the streaming master may divide the content into an audio stream that is provided to the audio master and a video stream that is provided to the video master.

The audio master may receive audio content (e.g., an audio stream) from the streaming master. In some cases, the audio master may perform digital signal processing (DSP) to the audio content. For example, the audio content may be decoded into multiple audio streams to provide surround sound (e.g., left and right (stereo), 5 channel surround sound, 7 channel surround sound, or the like). The DSP may include modifying a phase, a frequency, or both of individual audio streams of the multiple audio streams. The master device may provide information to the audio master regarding which of the available devices are being used to playback audio and the role (e.g., left channel, right channel, and the like) of each of the audio devices. The audio master may send each audio stream to a particular device of the audio devices according to the role of the particular device. For example, for music played in stereo, a left audio stream may be sent to a device having a left speaker role and a right audio stream may be sent to a device having a right speaker role. As another example, for audio or video being played in 5 channel surround, a left front (LF) audio stream may be sent to a device having a left front (LF) speaker role, a center audio stream may be sent to a device having a center channel speaker role, a right front (RF) audio stream may be sent to a device having a right front (RF) speaker role, a left rear (LR) audio stream may be sent to a device having a left rear (LR) speaker role, and a right rear (RR) audio stream may be sent to a device having a right rear (RR) speaker role. In some cases, the audio master device may be separate from the devices that are playing back the various audio streams (LF, Center, RF, LR, RR) while in other cases the audio master may, in addition to performing the audio master role, also perform the role of playing back one of the LF, Center, RF, LR, or RR streams. For surround sound operations, the audio master device may initially be positioned where listeners or viewers will be located, and an audio signal may be transmitted from each of the audio devices (e.g., LF, Center, RF, LR, RR) and a microphone of the device may measure the signal, including signal strength, signal phase, time delay (between when the signal is transmitted and when the signal is received at the microphone). This signal-related information may be used to create custom signal processing for each of the LF, Center, RF, LR, RR streams. The custom signal processing may modify an amplitude, a phase, and one or more frequencies of individual streams of the LF, Center, RF, LR, RR streams to provide an immersive audio experience to listeners.

The video master may receive video content (e.g., a video stream) from the streaming master. The master device may provide information to the video master regarding which of the available devices are being used to display video and the role (e.g., top left, top right, bottom left, bottom right or the like) of each of the video devices. If a single device of the available devices is being used to display video, the video master may also display the video content. If two or more of the available devices (one of which may be the video master) are being used, the video master may provide positioning information indicating how each device is to be positioned. For example, multiple devices may be positioned in such a way as to create a large screen comprised of the multiple screens of the multiple devices. To illustrate, four tablets that each have a screen (e.g., display device) of about 10"×8" may be placed in a particular configuration to create a 20"×16", thereby enabling viewers to experience viewing a larger (e.g., composite) screen than each individual screen. The video master may split the video content received from the streaming master into multiple video streams and send individual streams to individual devices that are being used to create the composite screen. For example, when using four tablets, a first tablet may be sent a top left portion of the video content, a second tablet may be sent a top right portion of the video content, a third tablet may be sent a bottom left portion of the video content, and a fourth tablet may be sent a bottom right portion of the video content.

As a first example, a computing device may include a non-transitory computer readable storage media to store instructions executable by one or more processors to perform various operations. For example, the operations may include broadcasting an activity message to a set of computing devices located in a wide area network. The activity message may indicate that an activity is scheduled to occur at a particular time and at a particular location. For example, the activity may include at least one of: playing back media content, or streaming the media content. The media content may be one of music content or video content. The operations may include performing, at a predetermined time interval prior to the particular time, a discovery process to determine a subset of the set of computing devices that are located within a predetermined distance from the particular location. The operations may include instructing the subset of computing devices to create a peer-to-peer network. The operations may include determining a role of individual computing devices in the subset of computing devices. For example, determining the role of individual computing devices in the subset of computing devices may include: (i) sending a request to the subset of computing devices to provide a set of attributes associated with the individual computing devices in the subset of computing devices, (ii) receiving the set of attributes from the individual computing devices in the subset of computing devices, and (iii) determining the role of a particular computing device in the subset of computing devices based at least in part on the set of attributes associated with the particular computing device. The role may include at least one of: a master device, a video master, an audio master, a streaming master, a portion of a composite screen, a left speaker, a right speaker, a center channel speaker, a left rear speaker, or a right rear speaker. The set of attributes may include: a video resolution of a display device associated with the particular computing device, a screen size of the display device, a frequency response of one or more transducers associated with the particular computing device, a clock speed associated with a processor of the particular computing device, a number of cores of the processor, a maximum download speed associated with the particular computing device, and an amount of storage accessible to the particular computing device. The operations may include sending the role to the individual computing devices in the subset of computing devices. The operations may include determining, based at least in part on the role and the set of attributes, a position identifying a physical placement of the particular computing device, and sending the position to the particular computing device. The operations may include initiating the activity using the subset of computing devices. The operations may include performing the discovery process a predetermined amount of time after the activity is initiated, determining, using the discovery process, the subset of computing devices located within a predetermined distance from the particular location, determining that the subset of computing devices includes a new device, instructing the new device to join the peer-to-peer network, determining the role of the new device, sending the role to the new device, and resuming the activity using the subset of computing devices that includes the new device. The operations may include performing the discovery process a predetermined amount of time after the activity is initiated, determining, using the discovery process, the subset of computing devices located within a predetermined distance from the particular location, determining that the subset of computing devices excludes a previously included device (e.g., a device that was participating in the activity has been removed), determining the role of individual computing devices in the subset of computing devices, and resuming the activity using the subset of computing devices that excludes the previously included device.

As a second example, a computing device may include: one or more processors and one or more non-transitory computer readable media to store instructions executable by the one or more processors to perform various operations. For example, the operations may include receiving, via a software application, an activity message indicating that an activity is scheduled to occur at a particular time and at a particular location. The operations may include participating in a discovery process initiated by a master device within a predetermined time interval prior to the particular time. The discovery process may be performed to discover a subset of computing devices located within a predetermined distance from the particular location. The operations may include creating a peer-to-peer network with the subset of computing devices. The operations may include sending, to the master device, a set of attributes of the computing device. The set of attributes may include: a video resolution of a display device associated with the particular computing device, a screen size of the display device, a frequency response of one or more transducers associated with the particular computing device, a clock speed associated with a processor of the particular computing device, a number of cores of the processor, a maximum download speed associated with the particular computing device, and an amount of storage accessible to the particular computing device. The operations may include receiving, from the master device, a role to perform when the activity is initiated. The master device may determine the role based at least in part on the set of attributes. The operations may include performing the role when the activity is initiated at the particular time. The activity may include at least one of: playing back media content, or streaming the media content. The media content may include music content or video content. The operations may include receiving, from the master device, a position identifying a physical placement of the computing device when performing the role. The master device may determine the position based at least in part on the role and the set of attributes. For example, the role may include at least one of: a master device, a video master, an audio master, a streaming master, a portion of a composite screen, a left speaker, a right speaker, a center channel speaker, a left rear speaker, or a right rear speaker.

Figure 1:
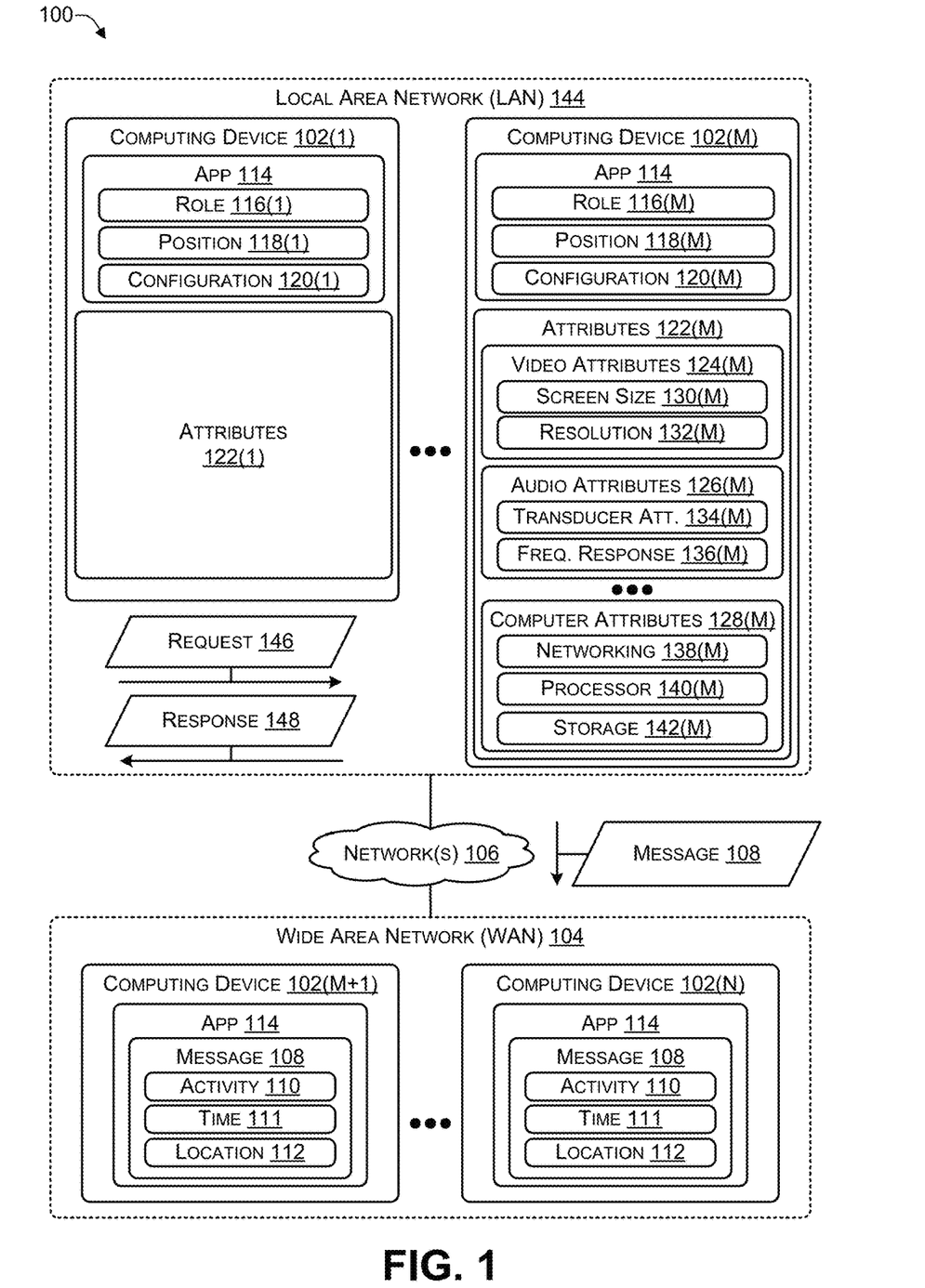
FIG. 1 is a block diagram of a system to broadcast a message to gather multiple devices to perform an activity, according to some embodiments.

FIG. 1 is a block diagram of a system 100 to broadcast a message to gather multiple devices to perform an activity, according to some embodiments. In the system 100, a computing device 102(1) may broadcast a message 108 via a network 106 to multiple computing devices 102(2) to 102(N) (N>0) in a wide area network (WAN) 104. The message 108 may be broadcast from the computing device 102(1) using an application ("app") 114 and may be received by other computing devices on which the app 114 is installed and which are located in the WAN 104. The message 108 include may include information indicating that an activity 110 (e.g., listen/dance to music, view or stream a show/movie, videoconference, or the like) is scheduled to begin at a time 111 (e.g., 8:00 PM) at a location 112 (e.g., living room, on the beach near the taco stand, near the campfire, or the like). The location 112 may be a location where the computing device 102(1) is currently located the location 112 may be a different location from where the computing device 102(1) is currently located.

In response to receiving the message 108, users of at least some of the computing devices 102 may relocate at least some of the computing devices 102 to within a predetermined distance of the location 112. For example, after the message 108 has been broadcast, computing devices 102(1) to 102(M) may be relocate near the location 112, while a remainder of the computing devices 102, such as the computing device 102(M+1) to the computing device 102(N) (1<M<N) may remain in the wide area network 104. For illustration purposes, an example in which N equals 50 and M equals 10 is used herein.

The computing device 102(1) may discover nearby (e.g., available) computing devices, such as the computing device 102(2) to the computing device 102(M), and create a local area network 144 with the nearby computing devices. For example, the local area network 144 may be a peer to peer network, and ad hoc network, Bluetooth pairing, or another type of local area network. The local area network 144 may be created using a technology or a communications standard such as, for example, Bluetooth, ZigBee, Wi-Fi Direct or the like. The computing device 102 may send a request 146 to the other computing devices 102(2) to 102(M) in the local area network 144 to provide attributes 122 associated with the computing device 102(1). For example, each of the computing devices 102(1) to 102(M) may have an associated set of attributes. For example, the computing device 102(1) may have attributes 122(1) and the computing device 102(M) may have attributes 122(M).

The set of attributes 122(M) may include for example video attributes 124(M), audio attributes 126(M), and computer attributes 128(M). The video attributes 124(M) may include a screen size 130(M) and a resolution 132(M) of the screen. The audio attributes 126(M) may include transducer attributes 134(M) and eight frequency response 136(M). The computer attributes 128(M) may include networking attributes 138(M), processor attributes 140(M), and storage attributes 142(M). The screen size 130(M) may indicate a screen size of a display device associated with the computing device 102(M). The resolution 132(M) may indicate a resolution of the display device associated with the computing device 102(M), such as 720p, 1080p, 4K resolution, or the like. The transducer attributes 134(M) may indicate a size of one or more transducers (e.g., 2" speaker) that are included in (or connected to) the computing device 102(M). The frequency response 136(M) may indicate a frequency response (e.g., lowest reproduced frequency to highest reproduced frequency) of all the transducers of the one or more transducers (e.g., 100 Hertz (Hz) to 5,000 Hz) that are included in (or connected to) the computing device 102(M). The networking attributes 138(M) may indicate networking capabilities of the computing device 102(M), including types of interfaces (e.g., wired, wireless), standards (e.g., Ethernet, 802.11, Bluetooth, cellular 3G, 4G, 5G, and the like) to which the networking capabilities conform, a maximum download speed, a maximum transmission speed, and other networking attributes. The processor attributes 140(M) may indicate a type of processor (e.g., central processing unit (CPU)) associated with the computing device 102(M), a number of cores associated with the processor, a clock speed associated with the processor, and other processor-related attributes. The storage 142(M) may indicate an amount of memory, such as random-access memory (RAM), a storage capacity of one or more storage drives (e.g., attached to or included in the computing device 102(M)), an amount of storage accessible via the cloud (e.g., DropBox, GoogleDrive, OneDrive, or the like), and other storage accessible to the computing device 102(M).

Figure 3:
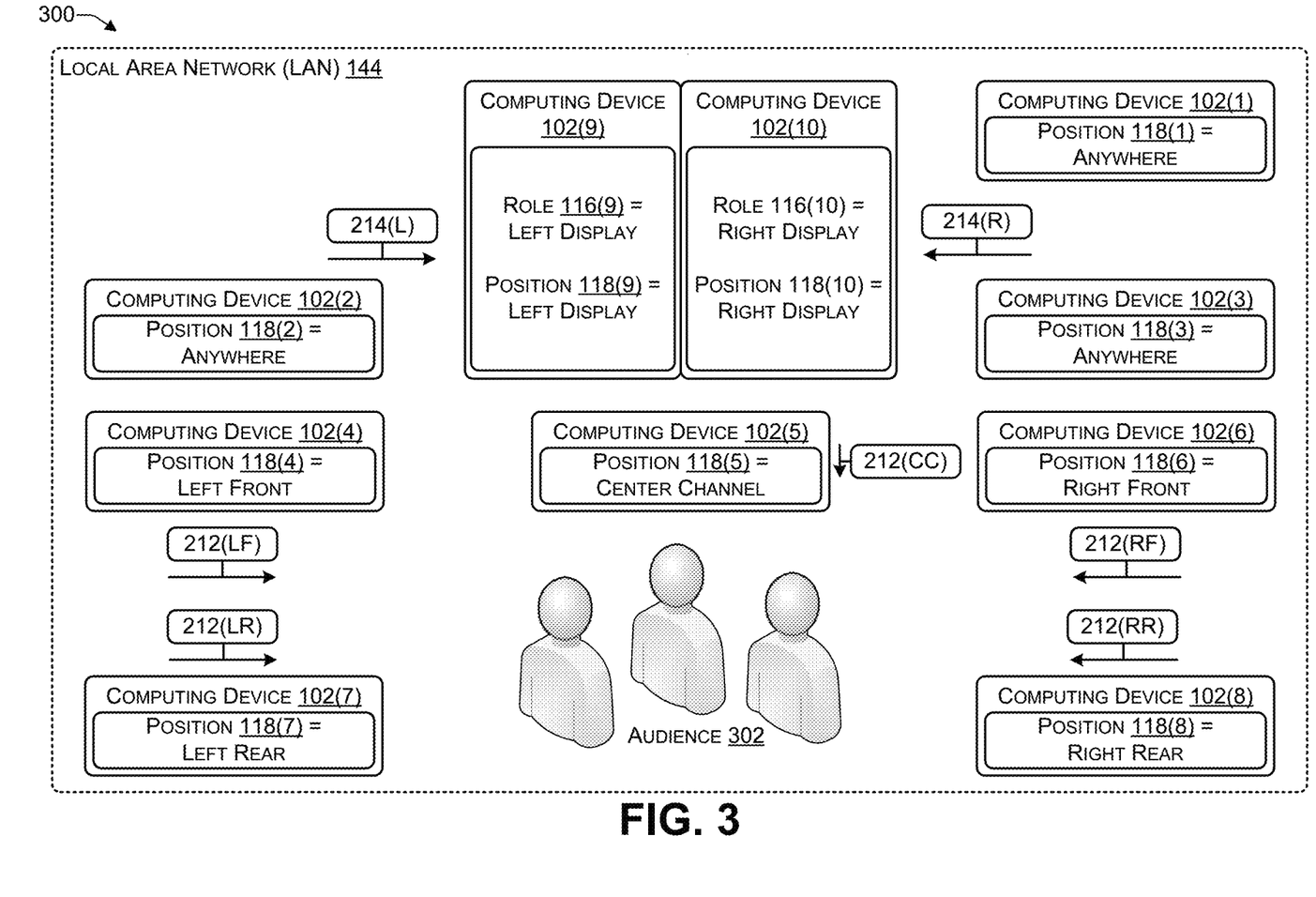
FIG. 3 is a block diagram of a system illustrating placement of each device of multiple devices to perform an activity based on each device's capabilities, according to some embodiments.

After receiving the set of attributes 122 in a response 148 from each of the computing devices 102(1) to 102(M) in the local area network 144, the computing device 102(1) may determine a role 116, a position 118, and a configuration 120 for individual devices of the computing devices 102(1) to 102(M). For example, the role 116 may be one of master device, audio master, video master, left front speaker, center speaker, right front speaker, left rear speaker, left display, right display, or the like. The position 118 may indicate where each of the computing devices 102 is to be physically positioned relative to at least one of the other devices. For example, when four tablet devices are being used to create a composite screen, a position of a first device may be top left, a position of a second device may be top right, a position of a third device may be bottom left, and the position of a fourth device may be bottom right. As another example, when creating a surround sound system, a position of a first device may be left of the composite screen, a position of a second device may be near a bottom of the composite screen, a position of a third device may be right of the composite screen, a position of a fourth device may be to the left of the composite screen and a particular distance from the first device, and a position of a fifth device may be to the right of the composite screen and the particular distance from the third device (e.g., as illustrated in FIG. 3).

Thus, the computing device 102(1) may broadcast, via the app 114, the message 108 to computing devices 102(2) to 102(N) (e.g., initially M=1, N>2). A subset of the computing devices 102 may gather at the location 112 prior to the time 111 to participate in the activity 110. Prior to the time 111, the computing device 102(1), in the role 116(1) of master device, may discover the computing devices 102(2) to 102(M) and create the LAN 144 (e.g., a peer-to-peer network). At this point, M may be greater than 1. For example, M may be 10 and N may be 50. Based on the set of attributes 122 associated with each of the computing devices 102(1) to 102(M) in the subset, the computing device 102(1) may assign each device in the subset a role and a position. Each of the computing devices 102 in the subset may be positioned in the location 112 according to the position and perform the role at the time 111 to collectively perform the activity 110.

Therefore, a user may use the app that is installed on multiple devices to gather a subset of the multiple devices together and assign each device a particular role based on each device's attributes to enable the subset of devices to collectively perform an activity, such as watching a movie or show, listening to music, performing a video conference, or the like. For example, when a group, such as a family or friends, are away from home (e.g., on vacation), each member of the group may have one or more devices (e.g., smartphone, tablet, 2-in-1, laptop, or the like). A member of the group may broadcast a message inviting other members of the group to bring one or more devices to participate in an activity. For example, the activity may include watching a movie (or show by) playing back or streaming video content, engaging in a video conference, listening (and/or dancing) to music by streaming music content, and other activities that can be performed using multiple devices. Each member of the group may receive, on at least one of their devices, the message with the request to participate in the activity. The message may indicate the activity, the activity location (e.g., a location where the activity is to take place), and a time when the activity is scheduled to begin (or a time range indicating a proposed start time and a proposed stop time). In some cases, each device that receives the message may determine and display a distance between the activity location and a current location of the device. If the user of the device decides to participate in the activity, the user may transport the device (and/or other devices owned or associated with the user) to the activity location.

The device that sent the message may initiate a discovery process at the activity location at (i) a predetermined time prior to the scheduled start of the activity or (ii) in response to a user initiating the discovery process. During the discovery process, the device may discover (e.g., using Bluetooth, Wi-Fi Direct, or a similar wireless technology) other devices that are available to participate in the activity. After discovering the available devices, the device may create a local area network (LAN) with the available devices, such as an ad-hoc network, a peer-to-peer network, Bluetooth pairing, or another type of local wireless network. The LAN may use a communications protocol such as Bluetooth, Wi-Fi Direct, ZigBee, or the like. The device may send a request to each of the available devices to send a set of attributes associated with the available device. For example, the set of attributes may include video attributes (e.g., screen size, screen resolution, and the like), audio attributes (e.g., number of transducers, size of each transducer, frequency response of each transducer, maximum output volume, and the like), and computer attributes, such as, type of processor, number of cores, processor speed, amount of storage (e.g., memory and disc), networking capabilities, connection technology (e.g., Ethernet, type of Wi-Fi, type of cellular connection (3G, 4G, 5G)), maximum upload and download speeds, and other computer-related attributes.

After receiving the set of attributes of each of the available devices, the device may analyze each set of attributes and determine what type of role each of the available devices is to have when the available devices collectively perform the activity. For example, a particular device having the highest computer attributes (e.g., fastest download speed, highest number of processor cores, fastest clock speed, or the like) may be designated as a master device.

The master device may periodically (e.g., at a predetermined time interval, such as every 30 seconds, every minute, every 5 minutes, or the like) discover the available devices, request the set of attributes of any newly discovered device(s), and determine a role for individual devices. In this way, the available devices may dynamically change and the master device may modify the role of individual devices based on the attributes of the currently available devices. The device that initially requested the set of attributes from individual devices may initially be designated, by default (because initially, it is the only available device), as the master device. After analyzing the set of attributes of the available devices, including the device's own attributes, the device may, in some cases, hand over the role of master device to one of the other available devices. For example, a user may broadcast a message to engage in the activity of viewing (e.g., streaming) a show or movie via a smartphone. After additional devices come into the vicinity of the location where the activity is to take place, one of the additional devices, such as a laptop or a tablet that has increased processing capabilities compared to the smartphone, may be designated the role of master device. The master device may assign, based on the analysis of the set of attributes of individual devices, a second device of the available devices to have the role of audio master and a third device of the available devices to have the role of video master. In some cases, the master device may assign the role of streaming master to a third device of the available devices while in other cases, the master device may also assume the role of the streaming master. The role of streaming master may be assigned to the device with the fastest download speed and may be used to stream content (e.g., music or video) from a streaming service (e.g., Netflix®, Disney®+, Amazon® Prime®, Apple® TV, iTunes®, or the like). For video, the streaming master may divide the content into an audio stream that is provided to the audio master and a video stream that is provided to the video master.

Figure 2:
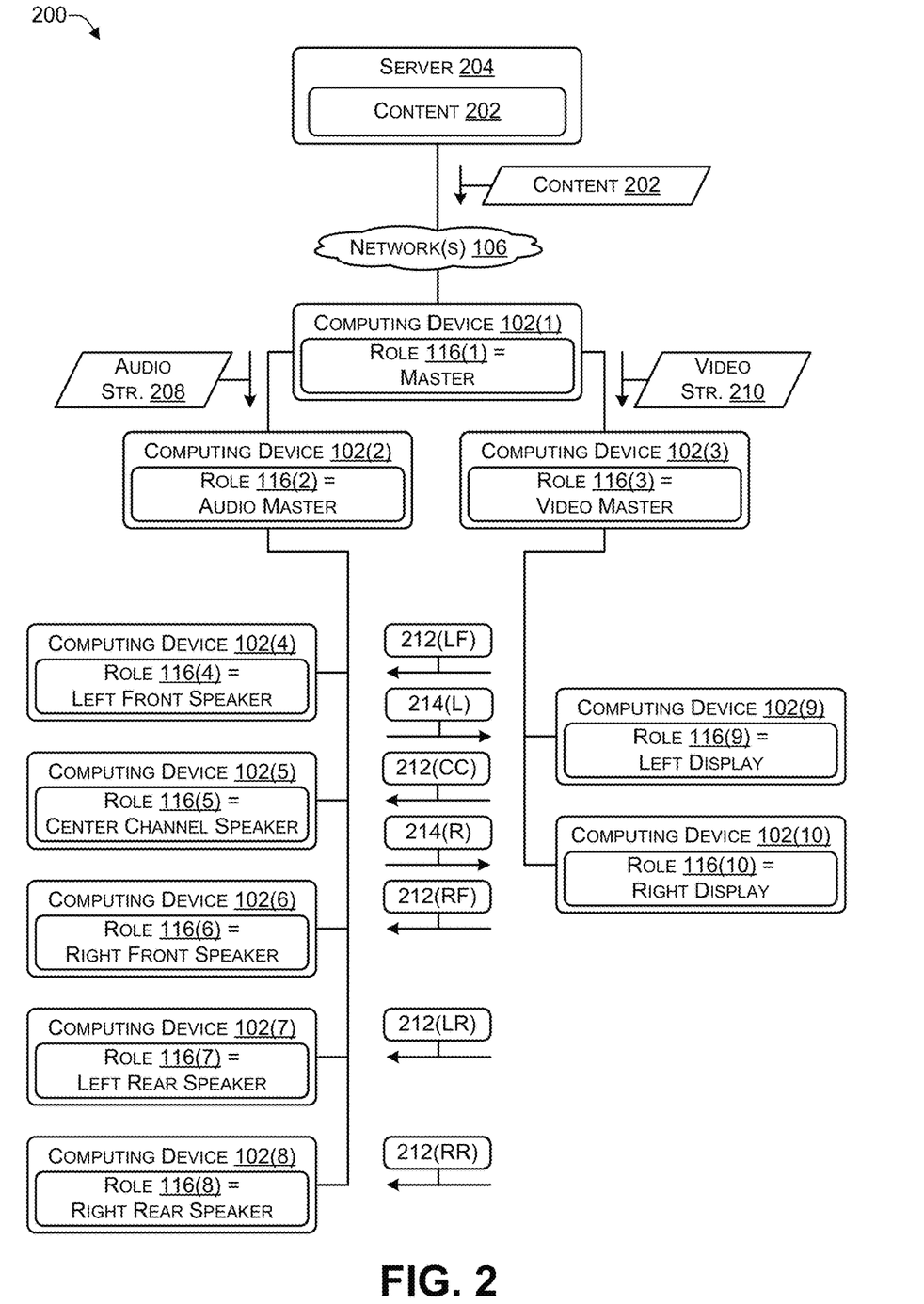
FIG. 2 is a block diagram of a system illustrating creating a hierarchy of devices to perform an activity based on each device's capabilities, according to some embodiments.

FIG. 2 is a block diagram of a system 200 illustrating creating a hierarchy of devices to perform an activity based on each device's capabilities, according to some embodiments. The functionality described in FIG. 2 is enabled through the use of the app 114 that is installed on each of the computing devices 102.

In FIG. 2, the computing device 102(1) is illustrated as being assigned the role 116(1) of master device. As the master device, the computing device 102(1) may playback media content stored on a storage device that is accessible to the computing device 102(1) or may stream media content 202 from a media content provider. For example, the computing device 102(1) may stream the content 202 that is hosted by the server 204.

As the master device, the computing device 102(1) may receive the content 202 from the server 204 (e.g., across the network 106) and divide the content 202 into an audio stream 208 and a video stream 210. The computing device 102(1) may send the audio stream 208(2) to a computing device that is assigned the role 116(2) of audio master, such as the computing device 102(2). The computing device 102(1) may send the video stream 210 to a computing device that is assigned the role 116(3) of video master, such as the computing device 102(3).

In the role of the audio master, the computing device 102(2) may decode (e.g., divide) the audio stream 208 into one or more additional streams, such as a left stream and a right stream. FIG. 2 illustrates decoding the audio stream 208 into five streams to provide five channel surround sound. For example, the computing device 102(2), as the audio master, may send a stream 212(LF) to a computing device having the role 116(4) of left front (LF) speaker, such as the computing device 102(4). The computing device 102(2) may send a stream 212(CC) to a computing device having the role 116(5) of center channel (CC) speaker, such as the computing device 102(5). The computing device 102(2) may send a stream 212(RF) to a computing device having the role 116(6) of right front (RF) speaker, such as the computing device 102(6). The computing device 102(2) may send a stream 212(LR) to a computing device having the role 116(7) of left rear (LR) speaker, such as the computing device 102(7). The computing device 102(2) may send a stream 212(RR) to a computing device having the role 116(8) of right rear (RR) speaker, such as the computing device 102(8).

In the role of the video master, the computing device 102(3) may divide the video stream 210 into one or more streams, based on the number of devices that are being used to create a composite screen. FIG. 2 illustrates dividing the video stream 210 into two streams when two devices are used to create a composite screen. For example, the computing device 102(3), as the video master, may send a stream 214(L) to a computing device having the role 116(9) of left display, such as the computing device 102(9). The computing device 102(10), as the video master, may send a stream 214(R) to a computing device having the role 116(10) of right display, such as the computing device 102(10).

Thus, the master device may assume the role of streaming master (or assign the role to another device). The streaming master may stream content (e.g., music or video) from a streaming service (e.g., Netflix®, Disney®+, Amazon® Prime®, Apple® TV, iTunes®, or the like). For video, the streaming master may divide the content into an audio stream that is provided to the audio master and a video stream that is provided to the video master.

The audio master may receive an audio stream from the streaming master. In some cases, the audio master may perform digital signal processing (DSP) to the audio content. For example, the audio content may be decoded into multiple audio streams to provide surround sound (e.g., left and right (stereo), 5 channel surround sound, 7 channel surround sound, or the like). The DSP may include modifying a phase, a frequency, or both of individual audio streams of the multiple audio streams. The master device may provide information to the audio master regarding which of the available devices are being used to playback audio and the role (e.g., left channel, right channel, and the like) of each of the audio devices. The audio master may send each audio stream to a particular device of the audio devices according to the role of the particular device. For example, for music played in stereo, a left audio stream may be sent to a device having a left speaker role and a right audio stream may be sent to a device having a right speaker role. As another example, for audio or video being played in 5 channel surround, a left front (LF) audio stream may be sent to a device having a left front (LF) speaker role, a center audio stream may be sent to a device having a center channel speaker role, a right front (RF) audio stream may be sent to a device having a right front (RF) speaker role, a left rear (LR) audio stream may be sent to a device having a left rear (LR) speaker role, and a right rear (RR) audio stream may be sent to a device having a right rear (RR) speaker role. In some cases, the audio master device may be separate from the devices that are playing back the various audio streams (LF, Center, RF, LR, RR) while in other cases the audio master may, in addition to performing the audio master role, also perform the role of playing back one of the LF, Center, RF, LR, or RR streams.

The video master may receive a video stream from the streaming master. The master device may provide information to the video master regarding which of the available devices are being used to display video and the role (e.g., top left, top right, bottom left, bottom right or the like) of each of the video devices. The video master may split the video content received from the streaming master into multiple video streams and send individual streams to individual devices that are being used to create the composite screen. For example, when using two tablets, a first tablet may be sent a left portion of the video content and a second tablet may be sent a right portion of the video content.

FIG. 3 is a block diagram of a system 300 illustrating placement of each device of multiple devices to perform an activity based on each device's capabilities, according to some embodiments. The functionality described in FIG. 3 is enabled through the use of the app 114 that is installed on each of the computing devices 102.

The computing devices 102(1), 102(2), 102(3), 102(4), 102(5), 102(6), 102(7), 102(8), 102(9), 102(10) of FIG. 2 may be positioned as illustrated in FIG. 3. In this example, the computing devices 102(1), 102(2), 102(3) are not playing back any portion of the media content and therefore the corresponding positions 118(1), 118(2), 118(3) have a position of "anywhere".

As the master device, the computing device 102(1) may playback or stream content and divide the content into an audio stream and a video stream. The computing device 102(1) may send the audio stream to a computing device that is assigned the role of audio master, such as the computing device 102(2). The computing device 102(1) may send the video stream to a computing device that is assigned the role of video master, such as the computing device 102(3).

In the role of the audio master, the computing device 102(2) may decode (e.g., divide) the audio stream into one or more additional streams. FIG. 3 illustrates decoding the audio stream into five streams to provide five channel surround sound. For example, the computing device 102(2), as the audio master, may send the stream 212(LF) to a computing device with the position 118(4) of left front (LF) speaker, such as the computing device 102(4). The computing device 102(2) may send the stream 212(CC) to a computing device having the position 118(5) of center channel (CC) speaker (e.g., center front), such as the computing device 102(5). The computing device 102(2) may send the stream 212(RF) to a computing device having the position 118(6) of right front (RF) speaker, such as the computing device 102(6). The computing device 102(2) may send the stream 212(LR) to a computing device having the position 118(7) of left rear (LR) speaker, such as the computing device 102(7). The computing device 102(2) may send the stream 212(RR) to a computing device having the position 118(8) of right rear (RR) speaker, such as the computing device 102(8).

In the role of the video master, the computing device 102(3) may divide the video stream into one or more streams, based on the number of devices that are being used to create a composite screen. FIG. 3 illustrates dividing the video stream into two streams when two devices are used to create a composite screen. For example, the computing device 102(3), as the video master, may send the stream 214(L) to a computing device having the position 118(9) of left display, such as the computing device 102(9). The computing device 102(10), as the video master, may send the stream 214(R) to a computing device having the position 118(10) of right display, such as the computing device 102(10). When four devices are used to create a composite screen, the positions 118 of the corresponding computing devices 102 may include top left, top right, bottom left, bottom right.

In this way, an audience 302 may view media content being displayed on the computing devices 102(9), 102(10) and have an immersive audio experience with 5-channel surround created by the transducers included in or connected to the computing devices 102(4), 102(5), 102(6), 102(7), and 102(8). Of course, with a smaller number of devices, fewer devices may be used. For example, the audio master (e.g., computing device 102(2)) may also assume the role of one of the speakers LF, CC, RF, LR, or RR. The video master (e.g., computing device 102(3)) may also assume the role of one of the displays (e.g., left display or right display). In addition, with fewer devices, the audio configuration may not include the rear speakers LR, RR. Furthermore, the roles 116 and the positions 118 may be dynamically (e.g., periodically, at a predetermined interval) adjusted based on the devices (and their corresponding set of attributes) that are available to join the LAN 144. For example, new people may arrive with additional devices to participate in the activity and some of the people currently participating may remove the participating devices from the LAN 144. The master device (e.g., computing device 102(1)) may be periodically (e.g., every X minutes, X>0), determine (e.g., discover) the available devices and the set of attributes of any new devices and determine roles and positions for each of the available devices based on the set of attributes associated with each device.

Figure 4:
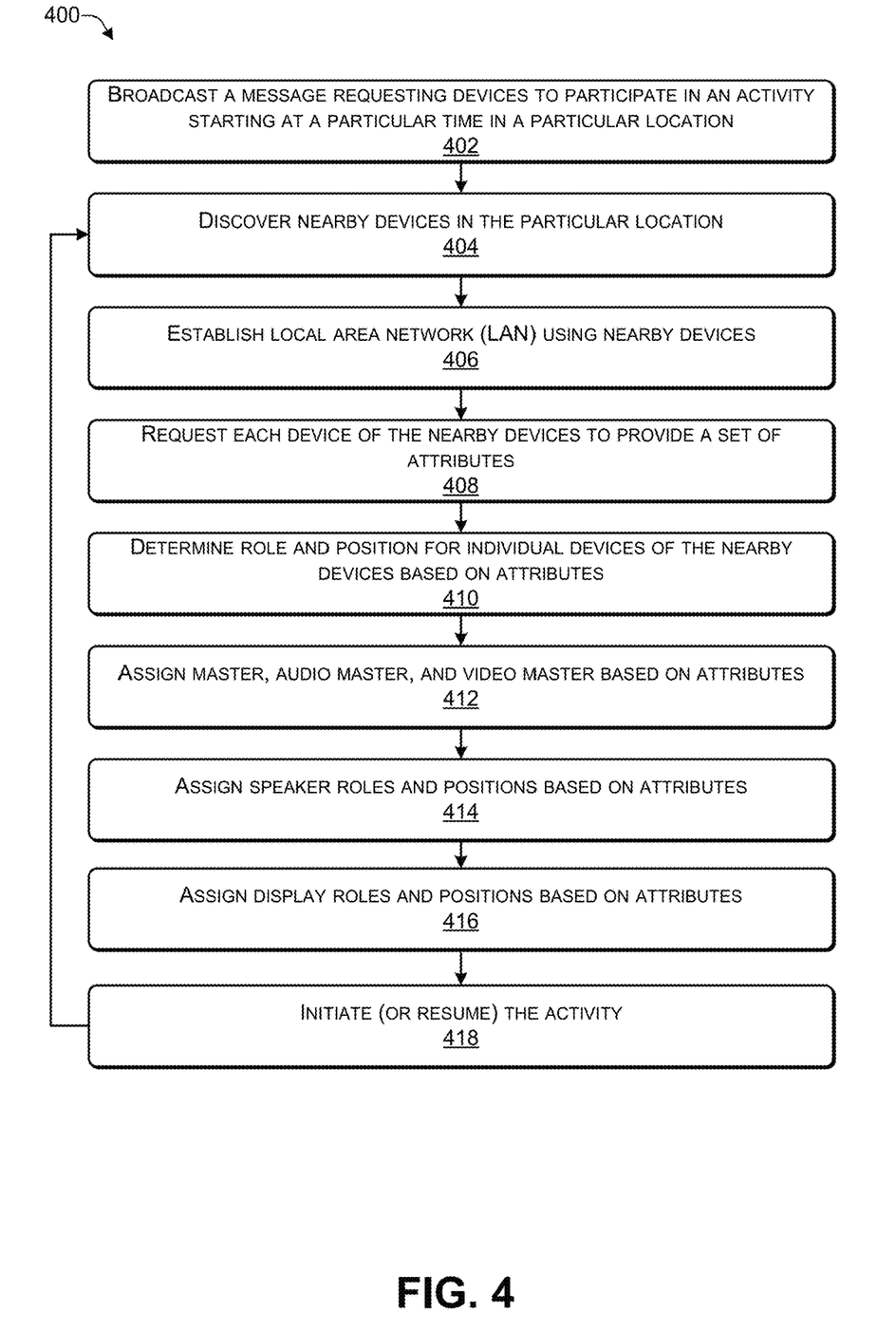
FIG. 4 is a flowchart of a process that includes broadcasting a message requesting devices to participate in an activity, according to some embodiments.
Figure 5:
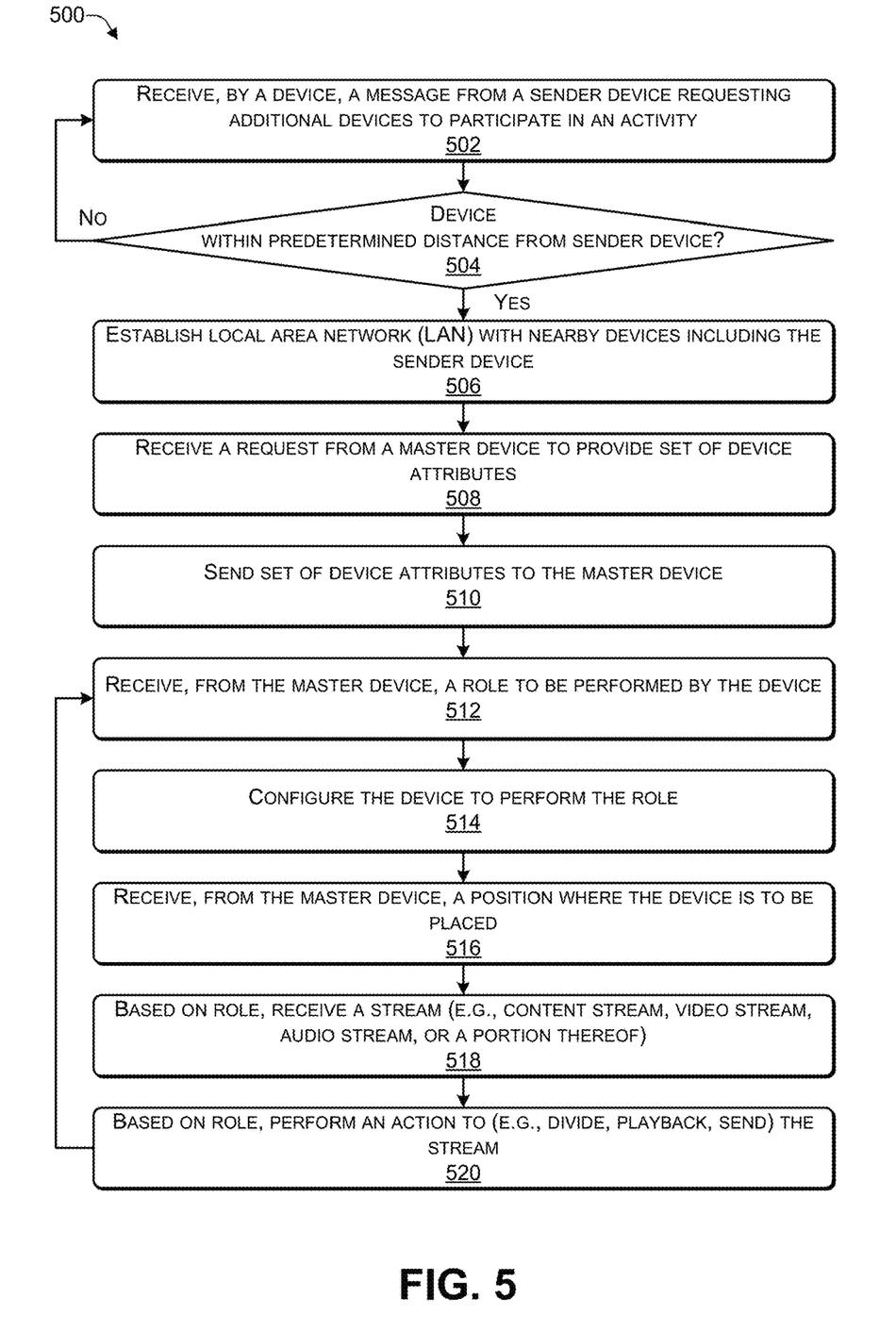
FIG. 5 is a flowchart of a process that include receiving a role to be performed by a device, according to some embodiments.

In the flow diagrams of FIGS. 4 and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400, 500 are described with reference to FIGS. 1, 2, and 3, as described above, although other models, frameworks, systems and environments may be used to implement these processes.

FIG. 4 is a flowchart of a process 400 that includes broadcasting a message requesting devices to participate in an activity, according to some embodiments. For example, the process 400 may be performed by the app 114 of FIG. 1.

At 402, the process may broadcast a message requesting devices to participate in an activity starting at a particular time in a particular location. For example, in FIG. 1, a user may use the app 114 to broadcast the message 108 inviting others to bring one or more of the computing devices 102(2) to 102(N) to participate in the activity 110 at the location 112. For example, the activity 110 may include watching a movie (or show by) playing back or streaming video content, engaging in a video conference, listening (and/or dancing) to music by streaming music content, and other activities that can be performed using multiple devices. The computing devices 102(2) to 102(N) may receive the message 108 with the request to participate in the activity 110 at the location 112. The message 108 may indicate the activity 110, the activity location 112, and the time 111 when the activity is scheduled to begin. If the user of the device chooses to participate in the activity 110, the user may transport the user's computing device (and/or other computing devices owned or associated with the user) to the activity location 112.

At 404, the process may discover nearby devices in the particular location. At 406, the process may establish a local area network using nearby devices. For example, in FIG. 1, the computing device 102(1) that sent the message 108 may initiate a discovery process at the activity location at (i) a predetermined time prior to the scheduled start time 111 of the activity 110 or (ii) in response to a user initiating the discovery process. During the discovery process, the computing device 102(1) may discover (e.g., using Bluetooth, Wi-Fi Direct, or a similar wireless technology) other computing devices (e.g., 102(2) to 102(M), M>1) that are available to participate in the activity 110. After discovering the available computing devices 102(2) to 102(M), the computing device 102(1) may create the LAN 144 with the available devices. For example, the LAN 144 may be an ad-hoc network, a peer-to-peer network, or another type of local wireless network. The LAN 144 may use a wireless communications protocol such as Bluetooth, Wi-Fi Direct, ZigBee, or the like.

At 408, the process may request that each device of the nearby devices provide a set of attributes. After receiving a set of attributes from each device of the nearby devices the process may, at 410, determine a role in the position for individual devices of the nearby devices based on the set of attributes. At 412, the process may assign the roles of a master device an audio master, and a video master based on the set of attributes. For example, in FIG. 1, the computing device 102(1) may send a request to each of the computing devices in the LAN 144 to send the set of attributes 122 associated with each computing device. For example, the set of attributes 122 may include video attributes 124 (e.g., screen size, screen resolution, and the like), audio attributes 126 (e.g., number of transducers, size of each transducer, frequency response of each transducer, maximum output volume, and the like), and computer attributes 128, such as, type of processor, number of cores, processor speed, amount of storage (e.g., memory and disc), networking capabilities, connection technology (e.g., Ethernet, type of Wi-Fi, type of cellular connection (3G, 4G, 5G)), maximum upload and download speeds, and other computer-related attributes.

At 414, the process may assign audio roles and corresponding positions based on the set of attributes. At 416, the process may assign video roles and corresponding positions based on the set of attributes. For example, in FIG. 1, after receiving the set of attributes 122 from each of the computing devices 102(2) to 102(M) in the LAN 144, the computing device 102(1) may analyze each set of attributes 122 and determine the role 116 and the position 118 of individual computing devices of the computing devices 102(2) to 102(M) performing the activity 110. For example, a particular device having the highest computer attributes (e.g., fastest download speed, highest number of processor cores, fastest clock speed, or the like) may be designated with the role of master device. For example, in FIG. 2, the computing device 102(1) may initially be assigned the role 116(1) of master device, by default, because initially, the computing device 102(1) may be the only available device. The master device may periodically (e.g., at a predetermined time interval, such as every 30 seconds, every minute, every 5 minutes, or the like) discover the available devices, request the set of attributes 122, and determine the role 116 of newly discovered device(s). In this way, the computing devices 102 in the LAN 144 may dynamically change and the master device may modify the role of individual computing devices based on the set of attributes 122 of the currently available devices in the LAN 144. After analyzing the set of attributes 122 of the available devices, including the attributes 122(1) of the computing device 102(1), the computing device 102(1) may, in some cases, hand over the role of master device to one of the other available devices in the LAN 144.

For example, in FIG. 2, the master computing device 102(1) may assign, based on the analysis of the set of attributes 122 of individual computing devices 102 in the LAN 144, a second device (e.g., the computing device 102(2)) the role 116(2) of audio master and assign a third device (e.g., the computing device 102(3)) the role 116(3) of video master. In some cases, the master computing device 102(1) may assign the role of streaming master to an additional device of the available devices in the LAN 144 while in other cases, the master computing device 102(1) may also assume the role of the streaming master. The role of streaming master may be assigned to the device with the fastest download speed and may be used to stream content (e.g., music or video) from a streaming service (e.g., Netflix®, Disney®+, Amazon® Prime®, Apple® TV, iTunes®, or the like). For video, the streaming master may divide the content into an audio stream that is provided to the audio master and a video stream that is provided to the video master.

At 418, the process may initiate (or resume) the activity. The process may periodically (e.g., at a pre-determined time interval, such as X minutes, X=1, 2, 3, or the like) proceed to 404 to discover nearby devices in the particular location. For example, in FIG. 2, the computing device 102(1) may stream or playback content 202. Periodically, the computing device 102(1) may determine if any computing devices have left the LAN 144 and if any additional computing devices have joined the LAN 144. In this way, the process may repeatedly perform 404, 406, 408, 410, 412, 414, 416, and 418 to dynamically adjust the roles and positions of the computing devices 102 that are currently available in the LAN 144 to participate in the activity 110.

FIG. 5 is a flowchart of a process 500 that include receiving a role to be performed by a device, according to some embodiments. For example, the process 500 may be performed by the app 114 of FIG. 1.

At 502, the process may receive a message from a sender device requesting additional devices to participate in an activity. At 504, the process may determine whether the device is within a predetermined distance from the sender device. If the process determines, at 504, that "no" the device is not within a predetermined distance from the sender device then the process may proceed to 502 and wait to receive another message. If the process determines, at 504, that "yes" the device is within the predetermined distance from the sender device, then the process may proceed to 506. For example, in FIG. 1, the computing device 102(1) may broadcast the message 108 inviting others to bring one or more computing devices to participate in the activity 110 at the time 111 at the location 112. Each of the computing devices 102(2) to 102(N) may receive, via the app 114, the message 108. In some cases, each device that receives the message may determine and display a distance between the activity location and a current location of the device. If the user of the device decides to participate in the activity, the user may transport the device (and/or other devices owned or associated with the user) to the activity location.

At 506, the process may establish a local area network with nearby devices, including the sender device. For example, in FIG. 1, the computing devices 102(1) to 102(M) may create the local area network (LAN) 144, such as an ad-hoc network, a peer-to-peer network, or another type of local wireless network. The LAN 144 may use a communications protocol such as Bluetooth, Wi-Fi Direct, ZigBee, or the like.

At 508, the process may receive a request from a master device to provide device attributes. In response, at 510, the process may send device attributes to the master device. For example, in FIG. 1, the computing device 102(1) may send a request to each of the computing devices 102 in the LAN 144 to send the set of attributes 122 associated with each computing device. In response, each of the computing devices 102(2) to 102(M) may send their respective set of attributes 122(2) to 122(M).

At 512, the process may receive a role to be performed by the device. At 514, the process may configure the device according to the role. At 516, the process may receive from the master device a placement position of the device. For example, in FIG. 2, each of the computing devices 102 may be assigned a role, such as master, audio master, video master, LF audio, CC audio, RF audio, LR audio, RR audio, L display, R display, and the like. Each of the devices 102 may modify the configuration 120 according to the role. For example, processes unrelated to the role may be shut off or changed to low (e.g., background) processes. To illustrate, for audio playback, the internal mixer may be adjusted to shut off the microphone, the display device may be dimmed (or turned off), and components not involved in receiving and reproducing audio may be placed in a low power state to conserve battery life. For video playback, audio components may be placed in a low power state, the display device settings (e.g., contrast, saturation, white balance, and the like) may be adjusted according to the activity 110 (e.g., "vivid", "cinema" or the like to watch a movie/show). For the master, the audio master, and the video master, the audio components may be placed in a low power mode, the display device may be dimmed or turned off, and networking resources, such as software and hardware related to receiving and sending data (e.g., via a network interface card (NIC)) may be given higher priority.

At 518, based on the role, the process may receive a content stream. At 520, based on the role the process may perform an action to the stream. As the master device, the computing device 102(1) may receive the content 202 from the server 204 (e.g., across the network 106) and divide the content 202 into an audio stream 208 and a video stream 210. The computing device 102(1) may send the audio stream 208(2) to a computing device that is assigned the role 116(2) of audio master, such as the computing device 102(2). The computing device 102(1) may send the video stream 210 to a computing device that is assigned the role 116(3) of video master, such as the computing device 102(3).

In the role of the audio master, the computing device 102(2) may decode (e.g., divide) the audio stream 208 into one or more additional streams, such as a left stream and a right stream. For example, in FIG. 2, the computing device 102(1), as the master, may playback media content stored on a storage device that is accessible to the computing device 102(1) or may stream media content 202 from a media content provider. The computing device 102(1) may stream the content 202 that is hosted by the server 204. The computing device 102(2), as the audio master, may send a stream 212(LF) to a computing device having the role 116(4) of left front (LF) speaker, such as the computing device 102(4). The computing device 102(2) may send a stream 212(CC) to a computing device having the role 116(5) of center channel (CC) speaker, such as the computing device 102(5). The computing device 102(2) may send a stream 212(RF) to a computing device having the role 116(6) of right front (RF) speaker, such as the computing device 102(6). The computing device 102(2) may send a stream 212(LR) to a computing device having the role 116(7) of left rear (LR) speaker, such as the computing device 102(7). The computing device 102(2) may send a stream 212(RR) to a computing device having the role 116(8) of right rear (RR) speaker, such as the computing device 102(8). In the role of the video master, the computing device 102(3) may divide the video stream 210 into one or more streams, based on the number of devices that are being used to create a composite screen. FIG. 2 illustrates dividing the video stream 210 into two streams when two devices are used to create a composite screen. For example, the computing device 102(3), as the video master, may send a stream 214(L) to a computing device having the role 116(9) of left display, such as the computing device 102(9). The computing device 102(10), as the video master, may send a stream 214(R) to a computing device having the role 116(10) of right display, such as the computing device 102(10).

Figure 6:
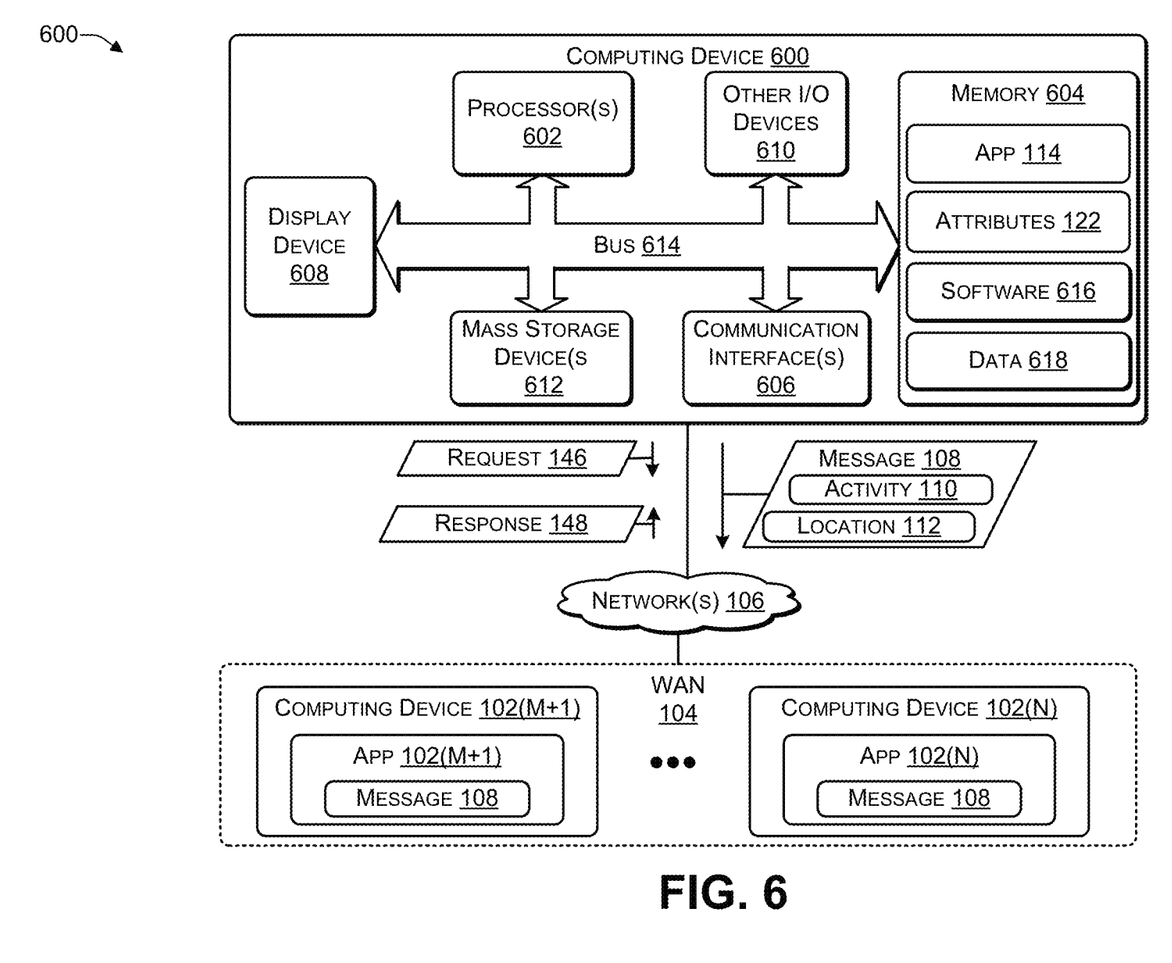
FIG. 6 illustrates an example configuration of a computing device that can be used to implement the systems and techniques described herein.

FIG. 6 illustrates an example configuration of a computing device 600 that can be used to implement the systems and techniques described herein, such as for example, each of the computing devices 102 of FIGS. 1, 2, and 3.

The computing device 600 may include one or more processors 602 (e.g., including a CPU, a graphics processing unit (GPU), or the like), a memory 604, communication interfaces 606, a display device 608, other input/output (I/O) devices 610 (e.g., a keyboard, a trackball, and the like), and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., Thunder-Bolt®, DVI, HDMI, and the like), power buses, etc.

The processors 602 are one or more hardware devices that may include a single processing unit or a number of processing units, all of which may include single or multiple computing units or multiple cores. The processors 602 may include a graphics processing unit (GPU) that is integrated with a CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein and may be any type of non-transitory media capable of storing computer-readable, processor-executable program instructions as computer program code that can be executed by the processors 602 as a particular machine configured for carrying out the operations and functions described in the implementations herein.

The computing device 600 may include one or more communication interfaces 606 for exchanging data via the network 136. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 608 may be used for displaying content (e.g., information and images) to users. Other I/O devices 610 may be devices that receive various inputs from a user and provide various outputs to the user, and may include a keyboard, a touchpad, a mouse, a printer, audio input/output devices, and so forth.

The computer storage media, such as memory 604 and mass storage devices 612, may be used to store software and data. For example, the computer storage media may be used to store the app 114, software 616 (e.g., operating system, drivers, other software applications) and data 618.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
broadcasting, by one or more processors, an activity message to a set of computing devices located in a wide area network, the activity message indicating that an activity is scheduled to occur at a particular time and at a particular location, wherein the one or more processors assume a master device role;
performing, by the one or more processors and within a predetermined time interval prior to the particular time, a discovery process to determine a subset of the set of computing devices located within a predetermined distance from the particular location;
instructing, by the one or more processors, the subset of computing devices to create a peer-to-peer network;
determining a role for each of the computing devices in the subset, including a video master role for a first computer device in the subset, an audio master role for a second computer device in the subset, and a streaming master role for a third computer device in the subset, wherein the third computer device, in the streaming master role, provides video content to the first computer device, in the video master role, and audio content to the second computer device, in the audio master role;
sending the roles to the computing devices, respectively, in the subset;
initiating the activity using the subset of computing devices;
determining, by the one or more processors, at least one of the subset of computing devices is suited to take on the master device role;
transferring the master device role to the at least one of the subset of computing devices; and
providing, by the master device to the video master, information regarding which of the subset of computing devices are being used to display video and a position associated with each of the subset of computing devices that are displaying video, wherein the position indicates where each of the subset of computing devices is physically positioned relative to at least one of the other devices to create a composite screen.

2. The method of claim 1, wherein determining the roles further comprises:
sending a request to the subset of computing devices to provide attributes associated with each of the computing devices in the subset;
receiving attributes from each of the computing devices in the subset; and
determining the roles based at least in part on the set of attributes associated with each of the computing devices in the subset.

3. The method of claim 2, further comprising:
determining, based at least in part on the roles and the attributes, positions, respectively, identifying physical placements, respectively, of the computing devices, respectively, in the subset; and
sending the positions to the computing devices, respectively, of the subset.

4. The method of claim 2, wherein the attributes comprises:
a video resolution of a display device associated with each of the computing devices of the subset;
a screen size of the display device;
a frequency response of one or more transducers associated with each of the computing devices of the subset;
a clock speed associated with a processor of each of the computing devices of the subset;
a number of cores of the processor;
a maximum download speed associated with each of the computing devices of the subset; and
an amount of storage accessible to each of the computing devices of the subset.

5. The method of claim 1, wherein the activity comprises at least one of:
playing back media content; or
streaming the media content;
wherein the media content comprises one of music content or video content.

6. The method of claim 1, further comprising:
performing the discovery process a predetermined amount of time after the activity is initiated;
determining, using the discovery process, the subset of computing devices located within a predetermined distance from the particular location;
determining that the subset of computing devices includes a new device;
instructing the new device to join the peer-to-peer network;
determining the role of the new device;
sending the role to the new device; and
resuming the activity using the subset of computing devices that includes the new device.

7. The method of claim 1, wherein the roles comprise:
a portion of a composite screen;
a left speaker;
a right speaker;
a center channel speaker;
a left rear speaker; or
a right rear speaker.

8. A computing device comprising:
one or more processors; and
one or more non-transitory computer readable media to store instructions executable by the one or more processors to perform operations comprising:
sending, from a software application, an activity message to a set of computing devices located in a wide area network, the activity message indicating that an activity is scheduled to occur at a particular time and at a particular location, wherein the one or more processors assume a master device role;
performing, within a predetermined time interval prior to the particular time, a discovery process to determine a subset of the set of computing devices located within a predetermined distance from the particular location;

instructing the subset of computing devices to create a peer-to-peer network;

determining a role for each of the computing devices in the subset, including a video master role for a first computer device in the subset, and an audio master role for a second computer device in the subset, and a streaming master role for a third computer device in the subset, wherein the third computer device, in the streaming master role, provides video content to the first computer device, in the video master role, and audio content to the second computer device, in the audio master role;

sending the roles to the computing devices, respectively, in the subset;

initiating the activity using the subset of computing devices;

determining, by the one or more processors, at least one of the subset of computing devices is suited to take on the master device role;

transferring the master device role to the at least one of the subset of computing devices; and providing, by the master device to the video master, information regarding which of the subset of computing devices are being used to display video and a position associated with each of the subset of computing devices that are displaying video, wherein the position indicates where each of the subset of computing devices is physically positioned relative to at least one of the other devices to create a composite screen.

9. The computing device of claim 8, wherein determining the roles further comprises:

sending a request to the subset of computing devices to provide attributes associated with each of the computing devices in the subset;

receiving attributes from each of the computing devices in the subset; and determining the roles of each of the computing devices in the subset based at least in part on the attributes associated with each of the computing devices in the subset.

10. The computing device of claim 9, wherein the set of attributes comprises:

a video resolution of a display device associated with each of the computing devices of the subset;

a screen size of the display device;

a frequency response of one or more transducers associated with each of the computing devices of the subset;

a clock speed associated with a processor of each of the computing devices of the subset;

a number of cores of the processor;

a maximum download speed associated with each of the computing devices of the subset; and an amount of storage accessible to each of the computing devices of the subset.

11. The computing device of claim 8, wherein the activity comprises at least one of:

playing back media content; or streaming the media content;

wherein the media content comprises one of music content or video content.

12. The computing device of claim 8, the operations further comprising:

performing the discovery process a predetermined amount of time after the activity is initiated;

determining, using the discovery process, the subset of computing devices located within a predetermined distance from the particular location;

determining that the subset of computing devices excludes a previously included device;

determining the role of individual computing devices in the subset of computing devices; and resuming the activity using the subset of computing devices that excludes the previously included device.

13. The computing device of claim 8, the operations further comprising:

performing the discovery process a predetermined amount of time after the activity is initiated;

determining, using the discovery process, the subset of computing devices located within a predetermined distance from the particular location;

determining that the subset of computing devices includes a new device;

instructing the new device to join the peer-to-peer network;

determining the role of the new device;

sending the role to the new device; and resuming the activity using the subset of computing devices that includes the new device.

14. The computing device of claim 8, wherein the role comprise a streaming master;

a portion of a composite screen;

a left speaker;

a right speaker;

a center channel speaker;

a left rear speaker; or a right rear speaker.

15. A computing device comprising:

one or more processors; and one or more non-transitory computer readable media to store instructions executable by the one or more processors to perform operations comprising:

receiving, via a software application, an activity message indicating that an activity is scheduled to occur at a particular time and at a particular location, wherein the one or more processors assume a role as a master device;

participating in a discovery process initiated by the master device within a predetermined time interval prior to the particular time to discover a subset of computing devices located within a predetermined distance from the particular location;

creating a peer-to-peer network with the subset of computing devices;

sending, to the master device, attributes of the computing device;

receiving, from the master device, a video master role to perform when the activity is initiated, wherein, in the video master role, receiving video content from a device in a streaming master role;

performing the video master role when the activity is initiated at the particular time;

determining, by the master device, at least one of the subset of computing devices is suited to take on the master device role;

transferring, by the master device, the master device role to the at least one of the subset of computing devices; and providing, by the master device to the video master, information regarding which of the subset of computing devices are being used to display video and a position associated with each of the subset of computing devices that are displaying video, wherein the position indicates where each of the subset of computing devices is physically positioned relative to at least one of the other devices to create a composite screen.

16. The computing device of claim 14, wherein:
the master device determines the video master role based at least in part on the set of attributes.

17. The computing device of claim 14, wherein the set of attributes comprises:
a video resolution of a display device associated with the particular computing device;
a screen size of the display device;
a frequency response of one or more transducers associated with the computing device;
a clock speed associated with a processor of the computing device;
a number of cores of the processor;
a maximum download speed associated with the computing device; and
an amount of storage accessible to the computing device.

18. The computing device of claim 14, wherein the activity comprises at least one of:
playing back media content; or
streaming the media content;
wherein the media content comprises one of music content or video content.

19. The computing device of claim 14, the operations further comprising:
receiving, from the master device, a position identifying a physical placement of the computing device when performing the role;
the position determined based at least in part on the role and the set of attributes.

* * * * *